United States Patent
Schallock

(10) Patent No.: US 11,414,326 B2
(45) Date of Patent: Aug. 16, 2022

(54) APPARATUS AND METHOD FOR DECHLORINATION OF DISCHARGE WATER

(71) Applicant: Jason Robert Schallock, Kihei, OR (US)

(72) Inventor: Jason Robert Schallock, Kihei, OR (US)

(*) Notice: Subject to any disclaimer, the term of this patent is extended or adjusted under 35 U.S.C. 154(b) by 160 days.

(21) Appl. No.: 16/786,847

(22) Filed: Feb. 10, 2020

(65) Prior Publication Data
US 2020/0198990 A1 Jun. 25, 2020

(51) Int. Cl.
*C02F 1/00* (2006.01)
*C02F 1/68* (2006.01)
*C02F 101/12* (2006.01)
*C02F 103/42* (2006.01)

(52) U.S. Cl.
CPC .............. *C02F 1/008* (2013.01); *C02F 1/685* (2013.01); *C02F 2101/12* (2013.01); *C02F 2103/42* (2013.01); *C02F 2201/005* (2013.01); *C02F 2209/003* (2013.01); *C02F 2209/29* (2013.01); *C02F 2209/40* (2013.01)

(58) Field of Classification Search
None
See application file for complete search history.

(56) References Cited

U.S. PATENT DOCUMENTS

| | | |
|---|---|---|
| 5,324,665 A | 6/1994 | Lessard |
| 5,413,706 A | 5/1995 | Graves |
| 6,221,257 B1 | 4/2001 | Grim |
| 6,294,096 B1 | 9/2001 | Pate |
| 6,464,885 B1 | 10/2002 | Smith |
| 6,503,404 B2 | 1/2003 | Ghalib |
| 7,150,827 B1 | 12/2006 | Grenning |
| 10,309,083 B2 | 6/2019 | Barrett |
| 2004/0238037 A1 | 12/2004 | Taylor et al. |
| 2004/0238458 A1 | 12/2004 | Taylor et al. |
| 2005/0127010 A1 | 6/2005 | Rosen et al. |
| 2005/0139530 A1* | 6/2005 | Heiss ................. C02F 9/00 210/85 |
| 2007/0138073 A1 | 6/2007 | Matthews |
| 2010/0187188 A1 | 7/2010 | Ghalib |

FOREIGN PATENT DOCUMENTS

WO WO2018102623 6/2019

* cited by examiner

*Primary Examiner* — Richard C Gurtowski

(57) ABSTRACT

A system and method for conditioning water is provided. A fluid flow sensor senses a flow of untreated discharge water passing through a water discharge drain line. The sensor generates one of a first sensor signal indicating a flow of the untreated discharge water and a second sensor signal indicating an absence of the flow of the untreated discharge water. A water conditioning controller transmits a first actuation signal to a conditioning agent pump when the first sensor signal is received, wherein a portion of a conditioning agent residing in a conditioning agent reservoir is pumped into the water discharge drain line to mix with the flow of untreated discharge water, and transmits a second actuation signal to the conditioning agent pump when the second sensor signal is received so that the portion of the conditioning agent is not pumped from the conditioning agent reservoir.

20 Claims, 4 Drawing Sheets

APPARATUS AND METHOD FOR DECHLORINATION OF DISCHARGE WATER

BACKGROUND OF THE INVENTION

In the arts of fluid discharge treatment, and in particular water discharge treatment, a variety of different and complex fluid treatment systems are known that are operable to treat fluids prior to discharge out from the fluid treatment systems. In particular, dechlorination treatment of water is of special concern in many situations, particularly when the chlorinated water is ultimately discharged into the ambient environment, such as a stream, a river, an ocean, a drain system, a storm sewage system, a dry well system, an injection system, a retention pod system, a sanitary system, a round water system, or other watershed.

However, such known legacy dechlorination treatment systems are relatively complex. Further, these legacy dechlorination treatment systems are relatively expensive to build, install, operate, and maintain. An example complex dechlorination treatment system is described in U.S. Pat. No. 6,464,885 (the contents of which is incorporated herein by reference in its entirety).

A further deficiency in legacy dechlorination treatment systems is that these dechlorination treatment systems are predicated on the assumption that there is a constant discharge flow of chlorinated water for treatment (or at least a discharge of the chlorinated water for a relatively long period of time). For example, the dechlorination treatment system of U.S. Pat. No. 6,464,885 requires a constant flow of chlorinated water for proper operation. In the absence of such a constant flow of chlorinated water, or when the flow pressure is relatively low, the venturi system of U.S. Pat. No. 6,464,885 becomes inoperable. Further, one skilled in the art appreciates that if the dechlorination treatment system of the U.S. Pat. No. 6,464,885 is operated on an intermittent basis (wherein chlorinated water discharge periodically occurs between intervening periods when the inlet system is empty), difficulties in operating the venturi system of the U.S. Pat. No. 6,464,885 may be encountered because of the trapped air pockets that may be created in the venturi system during those intervening periods when there is no discharge flow.

Additionally, relatively small water retention facilities exist that only need to discharge dechlorination water on an infrequent basis. Examples of such smaller facilities may include public or private recreational swimming pools, spas, or the like that are rarely emptied. Here, chlorine is maintained at some predefined level or range in the pool water for health and safety reasons. With such relatively small water retention facilities, complex and expensive water dechlorination treatment systems to condition water discharges may not be economically justifiable. Alternatively, or additionally, there may not be a sufficient amount of space at such relatively small water retention facilities for such legacy dechlorination treatment systems.

Further, small swimming pool and/or spa facilities typically employ a filtration system that uses sand, silica sand, zeosand, filterglass, filter media cartridges, and/or diatomaceous earth (D.E.) for filtration of the pool water. With these filter systems, the filter elements must be periodically backwashed to remove accumulated filtered particles. When the chlorinated pool water itself is used to perform filter backwashing, the discharged water from the pool filter inherently contains chlorine. Backwash or backwashing is defined herein as a process of cleaning the filter media of a pool filter by a method of reversing the flow of water to flush out contaminants lodged in the filter media. Accordingly, the user does not have to clean the filter medium manually. The backwash operation usually takes just a few minutes.

As yet another example, manual pool cleaning devices, such as a pool surface skimmer or a pool bottom cleaner, employ a water-based vacuum system to acquire larger objects that have fallen onto the surface of the pool water and/or that have fallen into the pool and have sunk to the pool bottom. Additionally, or alternatively, pool gutter systems employ a circulatory water flow system that transports objects that fall into the pool gutter into a manually cleaned filter or strainer, and/or into the pool filter system itself. Here, the vacuumed chlorinated water may be discharged.

In yet other situations, incoming chlorinated water from a public water system may require dechlorination treatment before use. For example, a marine aquarium facility must dechlorinate incoming water before introducing the water into the aquarium to avoid or mitigate the harmful effect of chlorine to the marine life that is exhibited in the aquarium.

Accordingly, there is a need in the arts for less complex dechlorination treatment systems that are particularly suited for water retention facilities that have intermittent or periodic discharge of chlorinated water. Such water retention facilities are commonly associated with smaller facilities, such as swimming pools, spas, or the like.

SUMMARY OF THE INVENTION

Embodiments of the water treatment system provide a system and method for conditioning water. In an example embodiment, a fluid flow sensor senses a flow of untreated discharge water passing through a water discharge drain line. The sensor generates one of a first sensor signal indicating a flow of the untreated discharge water and a second sensor signal indicating an absence of the flow of the untreated discharge water. A water conditioning controller transmits a first actuation signal to a conditioning agent pump when the first sensor signal is received, wherein a portion of a conditioning agent residing in a conditioning agent reservoir is pumped into the water discharge drain line to mix with the flow of untreated discharge water, and transmits a second actuation signal to the conditioning agent pump when the second sensor signal is received so that the portion of the conditioning agent is not pumped from the conditioning agent reservoir.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
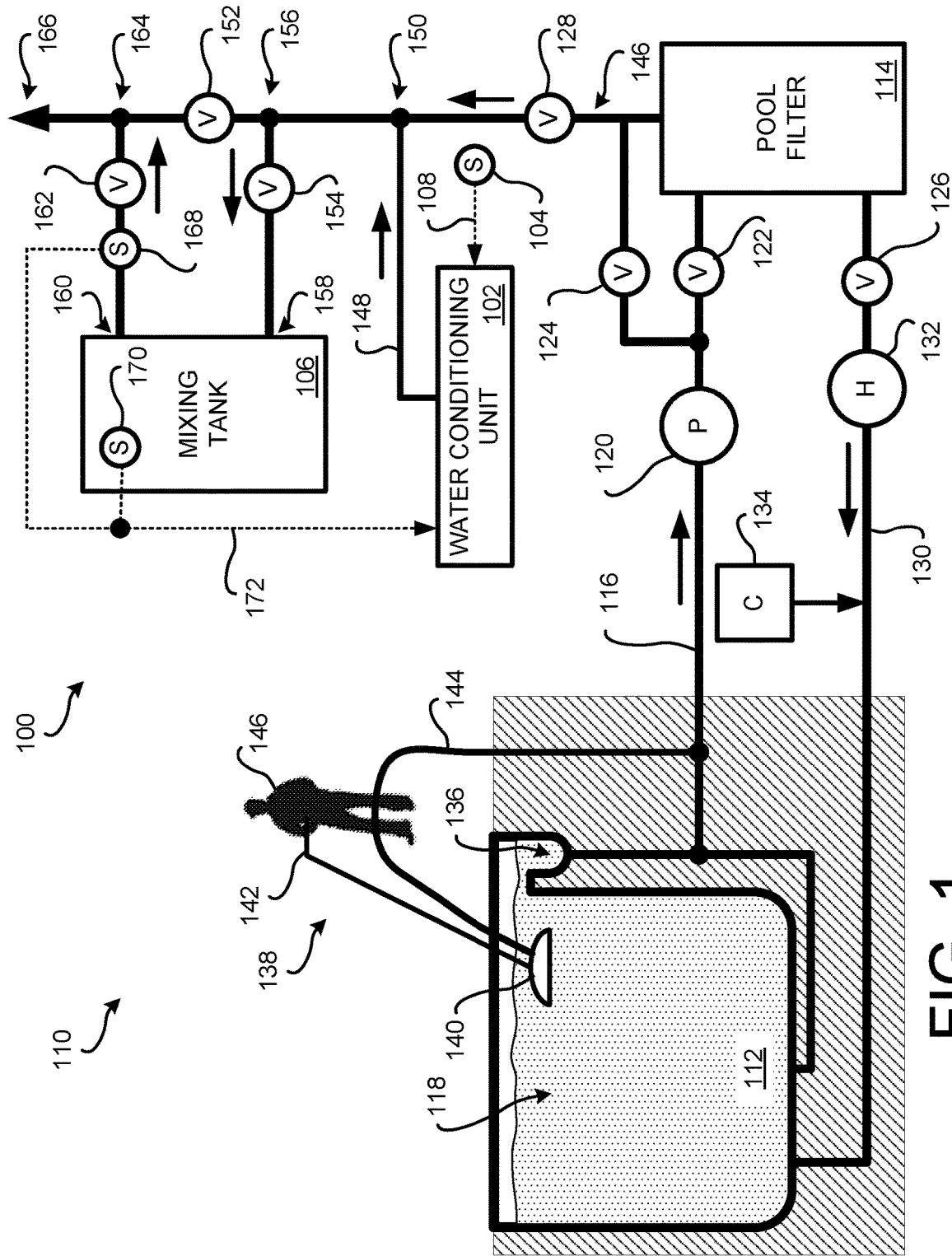
FIG. 1 conceptually illustrates an embodiment of the water treatment system implemented in a swimming pool system.

FIG. 1 is a block diagram of an example embodiment of a water treatment system 100. Embodiments of the water treatment system 100 provides a system and method for detecting the occurrence of a chlorinated water discharge, and in response to detecting the discharge, introduce a dechlorinating agent into the discharging water to dechlorinate the discharging water.

The disclosed water treatment system 100 will become better understood through review of the following detailed description in conjunction with the figures. The detailed description and figures provide merely examples of the various water treatment system 100 embodiments described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various water treatment system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Fluidly coupled" refers to physical structures such as tubes, pipes, channels, valves, sensors, inlets, outlets or the like that are physically coupled together so as to permit communication of fluids and/or solid material therethrough. "Communicatively coupled" refers to electronic devices that are electronically in communication with each other, typically using a wire-based connector or a wireless communication system.

A non-limiting example embodiment of a water treatment system 100 comprises a water conditioning unit 102, a fluid flow sensor 104, and an optional mixing tank 106. The sensor 104 senses information that indicates a water discharge. The sensor information is communicated to the water conditioning unit 102 via a wire-based or wireless communication link 108. In response to receiving the signal indicating a water discharge from the sensor 104, the water conditioning unit 102 inputs a dechlorination agent and/or other water conditioning agents into the discharging water flow to dechlorinate and/or otherwise condition the discharge water (interchangeably referred to herein as the treated discharge water). The treated discharge water may optionally be diverted into the mixing tank 106. The treated discharge water takes some amount of time to pass through the mixing tank 106, thereby providing time for reaction of the dechlorination agent and/or other water conditioning agents with the chlorine and/or other chemicals in the discharge water. The treated discharge water exiting the mixing tank 106 then may continue through the system to be discharged in the ambient environment to into another discharge system (such as a sewer system, storm drain system or the like). For example, the treated discharge water may be discharged into the ambient environment, such as a stream, a river, an ocean, a drain system, a storm sewage system, a dry well system, an injection system, a retention pod system, a sanitary system, a round water system, or a watershed.

FIG. 1 conceptually illustrates an embodiment of the dechlorination treatment system 100 implemented in a swimming pool system 110 comprising a pool 112 and a pool filter 114. A pool drain line 116 transfers pool water 118 from the pool 112 into the pool filter 114, which is typically transferred by operation of a pump 120. When the valve 122 is open (and the opposing valve 124 is closed), the pump 120 injects the drained pool water into the pool filter 114 such that particulates and/or chemicals are removed from the circulating pool water 118 by the filtering medium (not shown) of the pool filter 114. When valve 126 is open (and the opposing valve 128 is closed), the cleaned pool water 118 is then transferred back into the pool 112 via the drain line 130.

In some swimming pool systems 110, an optional pool water heater 132 disposed in the drain line 130 (or the drain line 116) is operated to increase the temperature of the pool water 118. Additionally, or alternatively, a chemical system 134 may be used to add chlorine and/or other water conditioning agents to regulate the chlorine level, Ph level, and/or other chemical conditions of the pool water 118.

In additional to draining pool water 118 into the pool drain line 116, pool water 118 may enter into the pool drain line 116 from other sources. For example, an optional gutter system 136 might be used to skim particulars from the surface of the pool water 118. Alternatively, or additionally, a pool cleaner device 138 (comprising a vacuum portion 140, and handle 142 and a drain line 144 connectable to the pool drain line 116) may be used by a person 146 to manually collect particles in the pool water 118.

When a portion of the pool water 118 is to be discharged from the swimming pool system 110, in the example swimming pool system 110 illustrated in FIG. 1, the valve 122 may be closed and the valve 124 may be opened to divert the draining pool water 118 into the pool water discharge drain line 146. Alternatively, in some swimming pool systems 110, the valve 126 may be closed and the valve 128 opened such that the pool water 118 is discharged from an outlet in the pool filter 114.

When the pool water 118 is being discharged out through the pool water discharge drain line 146, the sensor 104 senses the pool water discharge. In a preferred embodiment, the sensor 104 in a suitable in-line fluid flow sensor that senses the presence or absence of water flow through the pool water discharge drain line 146, such as, but not limited to, a dry contact fluid flow sensor, switch or the like.

In an alternative embodiment, the sensor 104 may detect operating positions of valves (i.e., open or closed positions). Here, the sensor 104 determines whether the valve 128 is being operated in a closed position (to block water flow) or in an open position (to permit water flow through the valve 128).

In the various embodiments, the fluid flow sensor 104 is configured to transmit an output signal, where the output signal consists of one of a first sensor signal corresponding to a sensing of the flow of the chlorinated discharge water through the pool water discharge drain line 146 and a second sensor signal corresponding to an absence of the flow of the chlorinated discharge water through the pool water discharge drain line 146.

In response to receiving a signal from the sensor 104 indicating a water discharge, in a preferred embodiment, the water conditioning unit 102 injects a predefined amount of dechlorination agent and/or other water conditioning agents into the discharging pool water 118. Here, assumptions are made regarding the chemical condition of the discharging pool water. For example, since the chemical system 134 continually adds chlorine and/or other water conditioning agents to regulate the chlorine level, Ph level, and/or other chemical conditions of the pool water 118 at predefined levels and/or ranges, the dechlorination treatment system 100 may reasonably assume the chlorine level and/or other chemical conditions of the discharging pool water 118. Further, because of the dimensional characteristics of the pool water discharge drain line 146 and the operating characteristics of the pump 120, a water volume discharge rate may be assumed (calculated). Thus, the amount of water, such as measure by gallons or liters per minute or the like, may be estimated.

Based on the assumed chlorine level and/or other chemical conditions of the discharging pool water 118, and the assumed discharge water flow rate, the amount of and/or discharge rate of the dechlorination agent and/or other water conditioning agents that is to be injected into the pool water discharge drain line 146 to condition the discharging pool water may be estimated (predefined). Accordingly, in response to the signal from the sensor 104 indicating a water discharge, the water conditioning unit 102 is actuated so as to inject the predefined amount and/or predefined rate of dechlorination agent and/or other water conditioning agents into the pool water discharge drain line 146, via line 148, at location 150.

In the illustrative embodiment of FIG. 1, the valve 152 (if present) is closed and the valve 154 is opened so that the treated discharge water is diverted into the mixing tank 106 (at location 156). In a preferred embodiment, the mixing tank 106 is optionally vertically oriented so that the treated discharge water enters into the lower portion of the mixing tank 106 (at location 158). As additional treated discharge water enters into the mixing tank 106 and the water level rises, after some amount of time the water level reaches the upper portion of the mixing tank 106 and then exits the mixing tank 106 (at location 160). When the optional valve 162 is opened, the treated discharge water re-enters back into the pool water discharge drain line 146 (at location 164) and exits (at location 166) into the ambient environment or into another drainage system (not shown).

Since the preferred embodiment of the dechlorination treatment system 100 predefines the amount of and/or rate of dechlorination agent and/or other water conditioning agents that is added into the discharging pool water 118 based on assumed conditions regarding the pre-treated discharging pool water 118 and the assumed discharge flow rate (based on the dimensions of the pool water discharge drain line 146 and the operating conditions of the pump 120), an unexpected result is realized that is a significant advantage over legacy water conditioning systems. Namely, embodiments of the dechlorination treatment system 100 may be very simple in both design (because fewer and/or simpler components are used) and operation (since complex water conditioning systems do not need to be maintained or operated when in use). This simplified design and operation results in a dechlorination treatment system 100 that is significantly less expensive than legacy water conditioner systems (since fewer components are required). Further, the installation size of the dechlorination treatment system 100 may be significantly smaller than legacy water conditioner systems (since fewer components are required). And, as another unexpected benefit, embodiments of the dechlorination treatment system 100 may be readily integrated in to existing water retention facilities, such as pools, spas or the like.

Some embodiments of the dechlorination treatment system 100 may optionally employ a sensor 168 that sense chemical conditions of the treated discharge water that is exiting form the mixing tank 106. Alternatively, or additionally, an optional sensor 170 may be located within the mixing tank 106 to sense chemical conditions of the treated discharge water in the mixing tank 106. A signal from the sensor 168/170 indicating information about the detected water condition(s) may be communicated to the water conditioning unit 102 via a wire-based or wireless connection 172. Based on the water condition information received from the sensor 168/170, the water conditioning unit 102 may dynamically adjust the amounts of injected dechlorination agent and/or other water conditioning agents.

For example, the sensor 168/170 may sense the chlorination level (amount of chlorine) of the treated discharge water. If the sensed chlorination level of the treated discharge water is above a first threshold, or outside of a predefined chlorination level range, the water conditioning unit 102 may operate to increase the amount of dechlorination agent that is injected. If the sensed chlorination level of the treated discharge water is lower that a second predefined threshold, or below the predefined chlorination level range, then the water conditioning unit 102 may be operated to reduce the amount of the dechlorination agent that is injected.

Alternatively, or additionally, the sensor 168/170 may sense the Ph level of the treated discharge water. If the sensed Ph level of the treated discharge water is above a first threshold, or outside of a predefined Ph level range, the water conditioning unit 102 may operate to increase the amount of Ph water conditioning agent that is injected. If the sensed Ph level of the treated discharge water is lower that a second predefined threshold, or below the predefined chlorination level range, then the water conditioning unit 102 may be operated to reduce the amount of the Ph water conditioning agent that is injected.

In some alternative embodiments of the dechlorination treatment system 100, the sensor 104 may also sense chemical conditions of the pre-treated discharge water that is exiting from the pool drain line 116 and/or the pool filter 114. A signal from the sensor 104 indicating information about the detected water condition(s) may be communicated to the water conditioning unit 102 via the wire-based or wireless connection 108. Based on the water condition information received from the sensor 108, the water conditioning unit 102 may dynamically adjust the amounts of injected dechlorination agent and/or other water conditioning agents.

Figure 2:
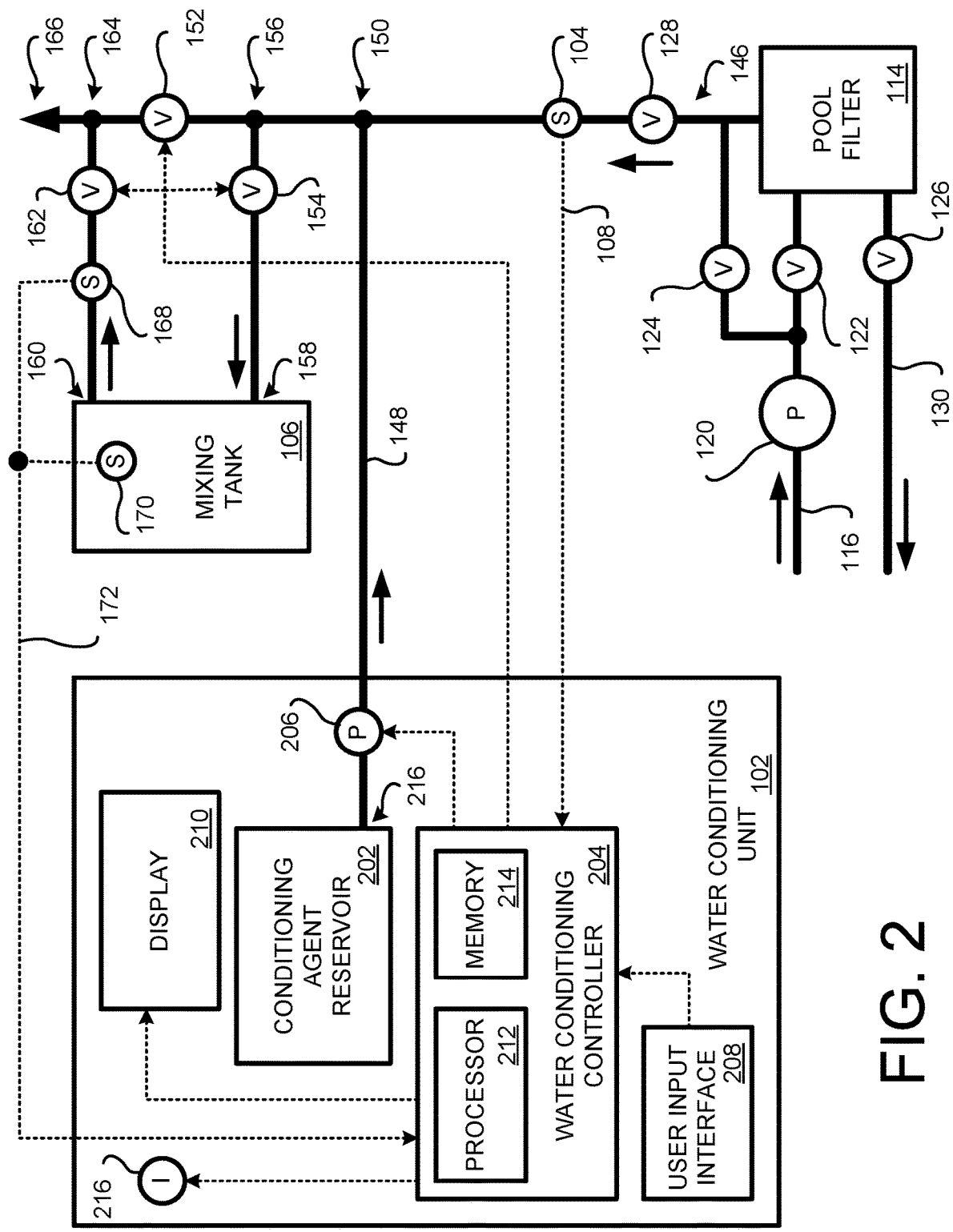
FIG. 2 is a block diagram of an example water conditioning unit.

FIG. 2 is a block diagram of an example water conditioning unit 102. The water conditioning unit 102 comprises a conditioning agent reservoir 202, a water conditioning controller 204, a conditioning agent pump 206, an optional user input interface 208 and an optional display 210. In a non-limiting embodiment, the water conditioning controller 204 may comprise a processor 212 and a memory 214. Some embodiments may employ an optional indicator light 216 to indicate operation of the water conditioning unit 102.

In the example embodiment of FIG. 2, when the sensor 104 detects a discharge of water through the pool water discharge drain line 146, information is communicated to the water conditioning controller 204 corresponding to the sensing of a water discharge. In response to receiving the signal from the sensor 104 indicating the discharge, the water conditioning controller 204 actuates the pump 206 to draw one or more conditioning agents from a reservoir exit 216 of the conditioning agent reservoir 202. The conditioning agent is then pumped, via line 148, into the pool water discharge drain line 146.

In some embodiments, a plurality of different conditioning agents are mixed together into the conditioning agent reservoir 202. For example, an amount of ascorbic acid and sodium ascorbate may be in the conditioning agent reservoir 202 to reduce the level of chlorine in the discharging water. Alternatively, other dechlorination agents may reside in the conditioning agent reservoir 202. Other conditioning agents may be included to adjust the Ph of the discharging water. One skilled in the art appreciates that any conditioning agent that is effective in conditioning any characteristic of the discharging water may be added into the conditioning agent reservoir 202.

Alternatively, a plurality of conditioning agent reservoirs 202 and associated pumps 206 may be used in the water conditioning unit 102. Here, the different conditioning agents may be kept from mixing together in a single conditioning agent reservoir 202 to avoid undesirable reactions between the mixed conditioning agents. When the sensor 104 detects a discharge, the water conditioning controller 204 may actuate the pumps 206 so that the conditioning agent residing in the respective conditioning agent reservoir 202 is then injected into the pool water discharge drain line 146. In some alternative embodiments, one or more of the plurality of conditioning agent reservoirs 202 use separate lines 148 to inject their respective conditioning agent into the pool water discharge drain line 146.

In embodiments where the sensor 104, and/or the sensor 168/170, detects a plurality of different conditions, the water conditioning controller 204 may selectively actuate the pumps 206 so that only the conditioning agent residing in the respective conditioning agent reservoir 202 is then injected into the pool water discharge drain line 146. For example, if the sensor 104 detects a high level of chlorine while the Ph is within an acceptable range, a first pump 206 may be actuated to add the dechlorination agent from the respective conditioning agent reservoir 202, while a second pump 206 is not actuated to add Ph conditioning agents residing in its respective conditioning agent reservoir 202.

The user input interface 208 facilitates user specification of various types of operations performed by the water conditioning unit 102. An example embodiments may allow the user to adjust the amount of or rate of conditioning agent that is output from the conditioning agent reservoir 202. Alternatively, or additionally, the user may adjust a duration of operation of the pump 206. Here, once a discharge is detected in the water treatment system 100 that employs the mixing tank 106, the amount of conditioning agent that is injected may be controlled by the time that the pump 206 is actuated. Here, the conditioning agent is injected into the pool water discharge drain line 146 only during the actuation of the pump 206, and the injected conditioning agent is mixed with the incoming water discharge in the mixing tank 106.

In an alternative embodiment, the line 148 may be alternatively coupled directly to the mixing tank 106 (rather than to the illustrated pool water discharge drain line 146). Here, the conditioning agent is injected into the mixing tank 106 during the actuation of the pump 206, and the injected conditioning agent is then mixed with the incoming water discharge in the mixing tank 106.

The optional display 210 may be used in some embodiments to facilitate user control of the settings of the water conditioning unit 102. Here, current settings such as the amount of and/or rate of injected conditioning agents may be indicated to the user. Additionally, or alternatively, predefined preferred ranges or amounts of conditioning agent may be recommended to the user on the display 210. If the ump(s) 206 is actuated for some specified amount of time, the operating time may be indicated to the user.

Any suitable processor 212 (or processing system) may be used in the various embodiments. Logic controlling operation of the water conditioning unit 102 may be stored in the memory 214. The user defined or predefined settings that control operation of the water conditioning unit 102 may also be stored in the memory 214. Additionally, or alternatively, operating history of the water conditioning unit 102 may be stored in the memory 214 so that the user may review past operations of the water conditioning unit 102. Any suitable memory medium may be used for the memory 214 in the various embodiments.

Figure 3:
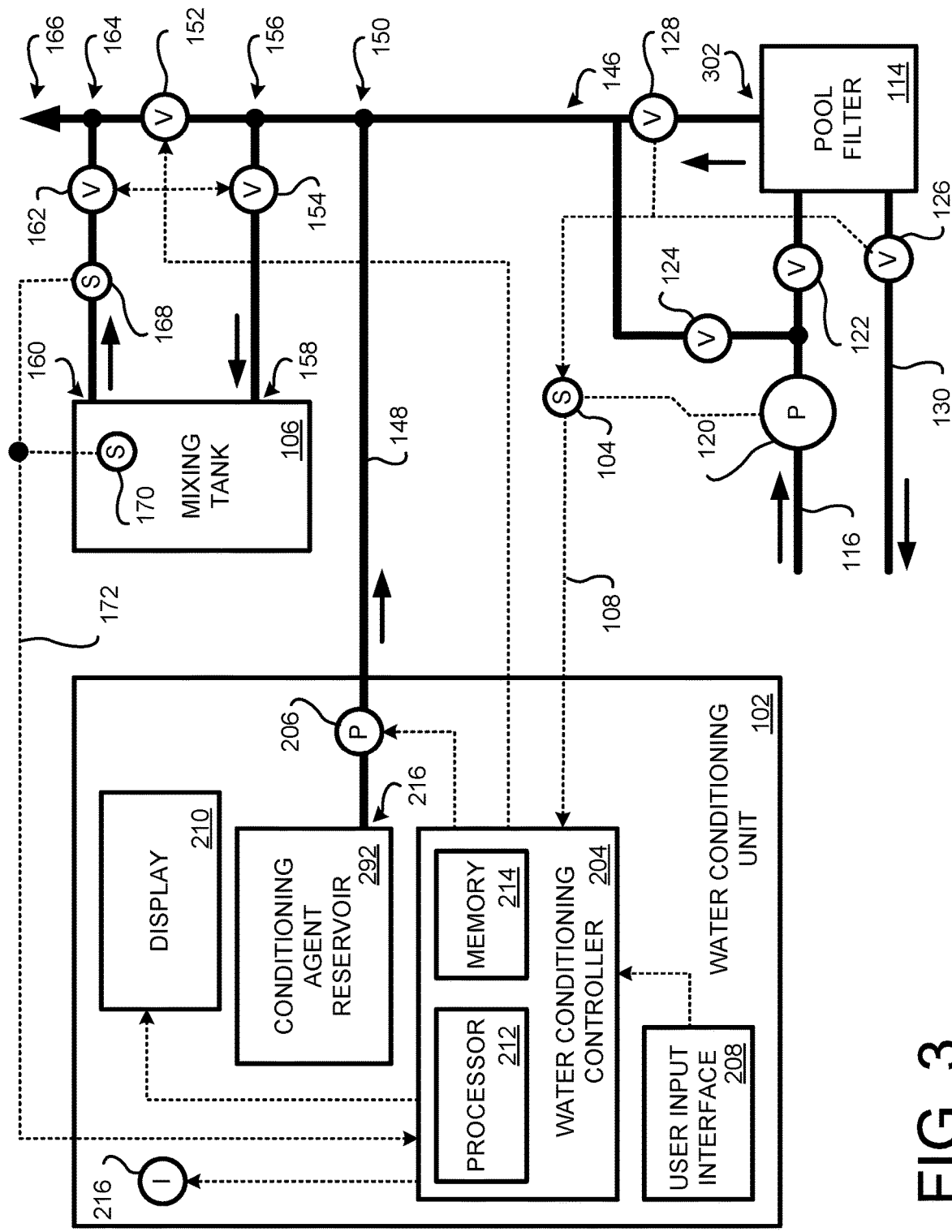
FIG. 3 is a block diagram of an example water conditioning unit 102 that is configured to sense valve positions.

FIG. 3 is a block diagram of an example water conditioning unit 102 that is configured to sense valve positions. In some applications, a water discharge will occur during cleaning of the pool filter 114. Typically, the filter medium in the pool filter 114 is cleaned by back flushing the filter medium. In the simplified system illustrated in FIG. 3, a backflushing operation is performed by opening valves 128 and 122, closing valve 126 (and valve 124 if present), and then after valve configuration, actuating the pump 120. Pool water 118 is then pumped through the pool filter 114 is a revere directions so as to flush out particulates that have been collected by the filtering media of the pool filter 114. The flushed water exits the pool filter 114 at a discharge outlet 302 and enters into the pool water discharge drain line 146.

As conceptually illustrated in FIG. 3, an example embodiment of the water treatment system 100 employs the sensor 102 to sense the valve positions (open or closed) of the valve 128, valve 126 and valve 128 (and optionally valve 124 is present), and optionally, actuation of the pump 120. When the valve configuration is as described above for a backflush operation, the sensor transmits a signal to the water conditioning controller 204, wherein the backflush operation indicates that the backflush operation is underway (which causes a water discharge). In response to the backflush operation, the water conditioning unit 102 operates to inject the dechlorination agent(s) into the pool water discharge drain line 146 (or into the mixing tank 106).

Figure 4:
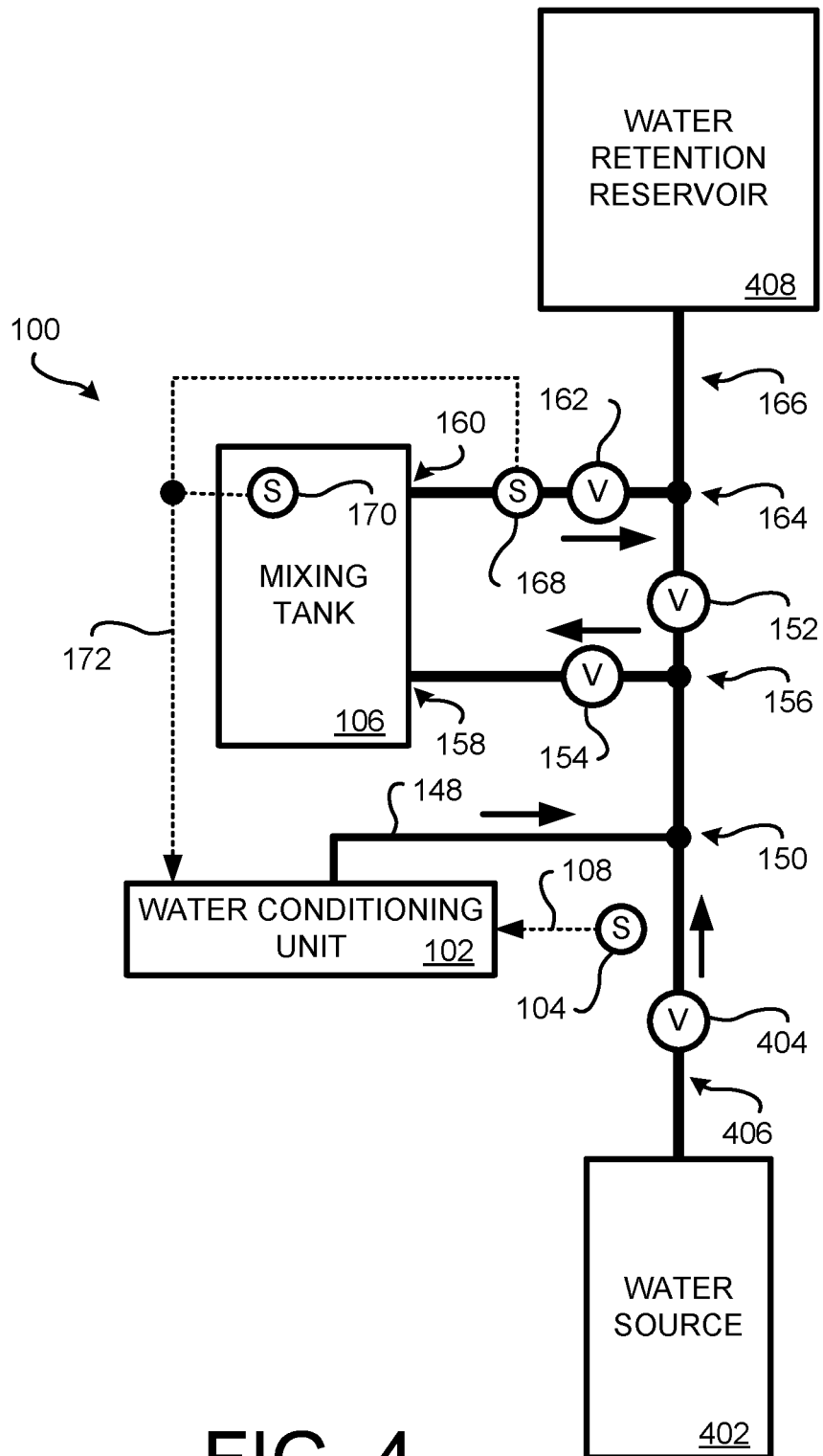
FIG. 4 is a block diagram of an example water conditioning unit that conditions input water.

FIG. 4 is a block diagram of an example water conditioning unit that conditions input water. These embodiments are configured to treat incoming water that is being provided to a water facility, such as an aquarium, zoo, marine exhibit or the like where the incoming water is not entirely suitable for immediate use. For example, incoming water from a water source 402, such as a city public water system is typically treated with chlorine and/or fluoride. These chemicals in the incoming water may have a harmful effect on creatures at the aquarium, zoo, marine exhibit or the like. Additionally, or alternatively, the Ph level of the incoming water may not be suitable for immediate use. Embodiments of the water treatment system 100 may be adapted to condition incoming water for use, such as by eliminating or reducing chlorination levels and/or adjusting Ph levels.

By opening the valve 404, the water intake line 406 receives the incoming water from the water source 402. In response to the sensor 104 sensing the incoming water flow, the water conditioning unit 102 operates to add conditioning agents into the water stream. In some embodiments, the optional mixing tank 106 provides some amount of time for the injected conditioning agents to react to condition the incoming water. After conditioning, the water it transferred to the water retention reservoir 408.

In some embodiments, the sensor 104 senses whether the valve 404 is being operated in an open position (wherein water from the water source flows into the water intake line 406) or a closed position (wherein the flow of water is blocked). In an alternative embodiment, the sensor 104 is a dry contact flow sensor, switch or the like that senses the presence or absence of water flow.

It should be emphasized that the above-described embodiments of the water treatment system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A dechlorination treatment system, comprising:
a fluid flow sensor that senses a flow of chlorinated discharge water passing through a discharge pipe,
   wherein the discharge pipe is fluidly coupled to a discharge outlet of a pool filter such that the chlorinated discharge water is forced out the discharge outlet of the pool filter into the discharge pipe,
   wherein the fluid flow sensor is configured to transmit an output signal, where the output signal consists of:
      a first sensor signal corresponding to a sensing of the flow of the chlorinated discharge water through the discharge pipe, and
      a second sensor signal corresponding to an absence of the flow of the chlorinated discharge water through the discharge pipe;
a dechlorinator controller communicatively coupled to the fluid flow sensor, wherein the dechlorinator controller receives one of the first sensor signal or the second sensor signal from the fluid flow sensor;
a dechlorinator agent reservoir configured to store a dechlorinator agent; and
a dechlorinator agent pump that is communicatively coupled to the dechlorinator controller, that is fluidly coupled to an outlet of the dechlorinator agent reservoir, and that is fluidly coupled to the discharge pipe,
wherein the dechlorinator controller transmits a first actuation signal that is received by the dechlorinator agent pump when the first sensor signal is received from the fluid flow sensor,
wherein the dechlorinator agent pump operates to pump a portion of the dechlorinator agent from the dechlorinator agent reservoir into the discharge pipe in response to receiving the first actuation signal,
wherein the pumped portion of the dechlorinator agent mixes with the flow of the chlorinated discharge water while there is flow of the chlorinated discharge water through the discharge pipe,
wherein the dechlorinator controller transmits a second actuation signal that is received by the dechlorinator agent pump when the second sensor signal is received from the fluid flow sensor, and
wherein the portion of the dechlorinator agent is not pumped from the dechlorinator agent reservoir by the dechlorinator agent pump into the discharge pipe in response to receiving the second actuation signal.

2. The system of claim 1, further comprising:
a valve fluidly coupled to the discharge pipe,
   wherein when the valve is open the flow of chlorinated discharge water passes through the valve, and
   wherein when the valve is closed the chlorinated discharge water does not pass through the valve; and
a mixing tank with an inlet, an outlet and a reservoir,
   wherein the inlet of the mixing tank is fluidly coupled to the discharge pipe at an upstream location from the valve, and
   wherein the outlet of the mixing tank is fluidly coupled to the discharge pipe at a downstream location from the valve,
wherein when the valve is closed the chlorinated discharge water is diverted from the discharge pipe at the upstream location into the inlet of the mixing tank,
wherein the discharge water exits the reservoir of the mixing tank through the outlet after some duration such that the dechlorinator agent that has been pumped into the chlorinated discharge water deactivates the chlorine, and
wherein the discharge water exiting the outlet of the discharge water re-enters the discharge pipe at the downstream location.

3. The system of claim 2,
wherein the valve is communicatively coupled to the dechlorinator controller,
wherein the dechlorinator controller transmits a valve close signal to the valve when the dechlorinator controller receives the first sensor signal from the fluid flow sensor such that the valve closes, and wherein the dechlorinator controller transmits a valve open signal to the valve when the dechlorinator controller receives the second sensor signal from the fluid flow sensor such that the valve opens.

4. The system of claim 1, further comprising:
a chlorination sensor that senses an amount of chlorination of the discharge water after the dechlorinator agent has been mixed with the chlorinated discharge water,
wherein the chlorination sensor is communicatively coupled to the dechlorinator controller, and
wherein the chlorination sensor outputs a signal that corresponds to the amount of sensed chlorination,
wherein the dechlorinator controller is configured to:
determine an amount of chlorination based on the signal received from the chlorination sensor,
compare the determined amount of chlorination with a threshold value,
increase the amount of dechlorinator agent that is pumped by the dechlorinator agent pump when the determined amount of chlorination is greater than a predefined range about the threshold value,
decrease the amount of dechlorinator agent that is pumped by the dechlorinator agent pump when the determined amount of chlorination is less than the predefined range about the threshold value, and
maintain the amount of dechlorinator agent that is pumped by the dechlorinator agent pump when the determined amount of chlorination is within the predefined range about the threshold value.

5. The system of claim 2, wherein the fluid flow sensor is a dry contact flow switch.

6. A water conditioning system, comprising:
a fluid flow sensor that senses a flow of untreated discharge water passing through a water discharge drain line,
wherein the water discharge drain line is fluidly coupled to a discharge outlet of a pool filter such that the untreated discharge water is forced out the discharge outlet of the pool filter into the discharge pipe,
wherein the fluid flow sensor is configured to transmit an output signal, where the output signal consists of:
a first sensor signal corresponding to a sensing of the flow of the untreated discharge water through the discharge pipe, and
a second sensor signal corresponding to an absence of the flow of the untreated discharge water through the water discharge drain line;
a water conditioning controller communicatively coupled to the fluid flow sensor, wherein the water conditioning controller receives one of the first sensor signal or the second sensor signal from the fluid flow sensor;
a conditioning agent reservoir configured to store a conditioning agent; and
a conditioning agent pump that is communicatively coupled to the water conditioning controller, that is fluidly coupled to an outlet of the conditioning agent reservoir, and that is fluidly coupled to the water discharge drain line,
wherein the water conditioning controller transmits a first actuation signal that is received by the conditioning agent pump when the first sensor signal is received from the fluid flow sensor,
wherein the conditioning agent pump operates to pump a portion of the conditioning agent from the conditioning agent reservoir into the water discharge drain line in response to receiving the first actuation signal,
wherein the pumped portion of the conditioning agent mixes with the flow of untreated discharge water to generate treated discharge water while there is flow of the chlorinated discharge water through the discharge pipe,
wherein the water conditioning controller transmits a second actuation signal that is received by the conditioning agent pump when the second sensor signal is received from the fluid flow sensor, and
wherein the portion of the conditioning agent is not pumped from the conditioning agent reservoir by the conditioning agent pump into the water discharge drain line in response to receiving the second actuation signal.

7. The system of claim 6, further comprising:
a valve fluidly coupled to the water discharge drain line,
wherein when the valve is open the flow of untreated discharge water passes through the valve, and
wherein when the valve is closed the untreated discharge water does not pass through the valve;
a mixing tank with an inlet, an outlet and a reservoir,
wherein the inlet of the mixing tank is fluidly coupled to the water discharge drain line at an upstream location from the valve, and
wherein the outlet of the mixing tank is fluidly coupled to the water discharge drain line at a downstream location from the valve,
wherein when the valve is closed the untreated discharge water is diverted from the water discharge drain line at the upstream location into the inlet of the mixing tank,
wherein the discharge water exits the reservoir of the mixing tank through the outlet after some duration such that the conditioning agent that has been pumped into the untreated discharge water conditions the discharge water to generate the treated discharge water, and
wherein the treated discharge water exiting the outlet of the mixing tank re-enters the water discharge drain line at the downstream location.

8. The system of claim 7,
wherein the valve is communicatively coupled to the water conditioning controller,
wherein the water conditioning controller transmits a valve close signal to the valve when the water conditioning controller receives the first sensor signal from the fluid flow sensor such that the valve closes, and
wherein the dechlorinator controller transmits a valve open signal to the valve when the water conditioning controller receives the second sensor signal from the fluid flow sensor such that the valve opens.

9. The system of claim 6, wherein the untreated discharge water is chlorinated discharge water, and wherein the conditioning agent is a dechlorinator agent that dechlorinates the untreated discharge water to generate the treated discharge water.

10. The system of claim 9, further comprising:
a chlorination sensor that senses an amount of chlorination of the discharge water after the dechlorinator agent has been pumped into the discharge pipe and after the dechlorinator agent has been mixed with the chlorinated discharge water,
wherein the chlorination sensor is communicatively coupled to the dechlorinator controller, and
wherein the chlorination sensor outputs a signal that corresponds to the amount of sensed chlorination,
wherein the dechlorinator controller is configured to:
determine an amount of chlorination based on the signal received from the chlorination sensor, compare the determined amount of chlorination with a threshold value, increase the amount of dechlorinator agent that is pumped by the dechlorinator agent pump when the determined amount of chlorination is greater than a predefined range about the threshold value, decrease the amount of dechlorinator agent that is pumped by the dechlorinator agent pump when the determined amount of chlorination is less than the predefined range about the threshold value, and maintain the amount of dechlorinator agent that is pumped by the dechlorinator agent pump when the determined amount of chlorination is within the predefined range about the threshold value.

11. The system of claim 6, wherein the treated discharge water is discharged into the ambient environment, wherein the ambient environment consist of one of a stream, a river, an ocean, a drain system, a storm sewage system, a dry well system, an injection system, a retention pod system, a sanitary system, a round water system, and a watershed.

12. The system of claim 6, wherein the fluid flow sensor is a dry contact flow switch.

13. A water treatment system, comprising:
a fluid flow sensor that senses a flow of water through a water intake line,
    wherein the water is provided from a water source, and
    wherein the fluid flow sensor is configured to transmit an output signal, where the output signal consists of:
        a first sensor signal corresponding to a sensing of the flow of the water through the water intake line, and
        a second sensor signal corresponding to an absence of the flow of the water through the water intake line;
a water conditioning controller communicatively coupled to the fluid flow sensor, wherein the water conditioning controller receives one of the first sensor signal or the second sensor signal from the fluid flow sensor;
a conditioning agent reservoir configured to store a conditioning agent; and
a conditioning agent pump that is communicatively coupled to the water conditioning controller, that is fluidly coupled to an outlet of the conditioning agent reservoir, and that is fluidly coupled to the water intake line,
wherein the water conditioning controller transmits a first actuation signal that is received by the conditioning agent pump when the first sensor signal is received from the fluid flow sensor,
wherein the conditioning agent pump operates to pump a portion of the conditioning agent from the conditioning agent reservoir into the water intake line in response to receiving the first actuation signal,
wherein the pumped portion of the conditioning agent mixes with the flow of water to generate conditioned water while there is flow of the water through the water intake line,
wherein the water conditioning controller transmits a second actuation signal to that is received by the conditioning agent pump when the second sensor signal is received from the fluid flow sensor, and
wherein the portion of the conditioning agent is not pumped from the conditioning agent reservoir by the conditioning agent pump into the water intake line in response to receiving the second actuation signal.

14. The system of claim 13, further comprising:
a valve fluidly coupled to the water intake line,
    wherein when the valve is open the flow of water passes through the valve, and
    wherein when the valve is closed the flow of water does not pass through the valve; and
a mixing tank with an inlet, an outlet and a reservoir,
    wherein the inlet of the mixing tank is fluidly coupled to the water intake line at an upstream location from the valve, and
    wherein the outlet of the mixing tank is fluidly coupled to the water intake line at a downstream location from the conditioning agent reservoir,
    wherein when the flow of water is diverted from the water intake line at the upstream location into the inlet of the mixing tank,
    wherein the conditioned water exits the reservoir of the mixing tank through the outlet after some duration such that the conditioning agent that has been pumped into the water conditions the water to generate the conditioned water, and
    wherein the conditioned water exiting the outlet of the mixing tank re-enters a water retention reservoir.

15. The system of claim 13, wherein the water flowing through a water intake line is chlorinated water, and wherein the conditioning agent is a dechlorinator agent that dechlorinates the flow of water to generate the conditioned water.

16. The system of claim 15, further comprising:
a chlorination sensor that senses an amount of chlorination of the conditioned water after the dechlorinator agent has been mixed with the conditioned water,
    wherein the chlorination sensor is communicatively coupled to the water conditioning controller, and
    wherein the chlorination sensor outputs a signal that corresponds to the amount of sensed chlorination,
wherein the water conditioning controller is configured to:
    determine an amount of chlorination based on the signal received from the chlorination sensor,
    compare the determined amount of chlorination with a threshold value,
    increase the amount of dechlorinator agent that is pumped by the conditioning agent pump when the determined amount of chlorination is greater than a predefined range about the threshold value,
    conditioning agent pump when the determined amount of chlorination is less than the predefined range about the threshold value, and
    maintain the amount of dechlorinator agent that is pumped by the conditioning agent pump when the determined amount of chlorination is within the predefined range about the threshold value.

17. The system of claim 13, wherein the fluid flow sensor is a dry contact flow switch.

18. A method of conditioning water, comprising:
sensing, using a fluid flow sensor, a flow of untreated discharge water passing through a water discharge drain line,
    wherein the water discharge drain line is fluidly coupled to a discharge outlet of a pool filter such that the untreated discharge water is forced out the discharge outlet of the pool filter into the discharge pipe,
    wherein the fluid flow sensor is configured to transmit an output signal, where the output signal consists of:
        a first sensor signal corresponding to a sensing of the flow of the untreated discharge water through the discharge pipe, and a second sensor signal corresponding to an absence of the flow of the untreated discharge water through the water discharge drain line;

receiving one of the first sensor signal or the second sensor signal at a water conditioning controller communicatively coupled to the fluid flow sensor;

transmitting a first actuation signal from the water conditioning controller that is received by a conditioning agent pump when the first sensor signal is received from the fluid flow sensor, wherein the conditioning agent pump is communicatively coupled to the water conditioning controller, and wherein the conditioning agent pump operates to pump a portion of a conditioning agent residing in a conditioning agent reservoir into the water discharge drain line so that the pumped portion of the conditioning agent mixes with the flow of untreated discharge water to generate treated discharge water while there is flow of the discharge water through the discharge pipe; and transmitting a second actuation signal from the water conditioning controller to that is received by the conditioning agent pump when the second sensor signal is received from the fluid flow sensor so that the portion of the conditioning agent is not pumped from the conditioning agent reservoir by the conditioning agent pump into the water discharge drain line.

19. The method of claim 18, further comprising:

diverting the treated discharge into an inlet of a mixing tank, wherein the treated discharge water exits a reservoir of the mixing tank through an outlet after some duration such that the conditioning agent that has been pumped into the untreated discharge water conditions the discharge water to generate the treated discharge water, and wherein the treated discharge water exiting the outlet of the mixing tank re-enters the water discharge drain line.

20. The method of claim 18, wherein the fluid flow sensor is a dry contact flow switch.

\* \* \* \* \*